United States Patent Office 3,170,806
Patented Feb. 23, 1965

3,170,806
HEAT SETTABLE BUTADIENE-STYRENE
COATING MIXTURES
Joseph G. Svrchek, Hinsdale, Ill., assignor to Dearborn
Chemical Company, Chicago, Ill., a corporation of
Illinois
No Drawing. Filed Feb. 1, 1963, Ser. No. 255,647
4 Claims. (Cl. 106—285)

The present invention deals with an improved composition which is settable by heat into an impervious protective coating. While the composition of the present invention is useful in protecting many types of articles against mechanical damage, corrosion, and the like, it is particularly useful in the field of coating pipes which are to be buried underground.

The most prevalent methods for protecting pipe which is to be buried underground involve the application of hot coatings such as coal tar, asphalt, or wax to the surface of the pipe followed by a spiral wrap. While these coating systems are relatively inexpensive raw materials, a substantial amount of labor is involved in applying them to the pipe and then the protection which they afford is not as great as would be desired. The chemical and electrical properties of such coatings on pipe are not completely satisfactory and corrosion of the pipe occurs with sufficient frequency that these methods of pipe protection are still less than wholly satisfactory. Hot applied coating systems are also liable to damage during transport, and damage by back-fill materials used on the job site. The coatings are also subject to damage by bending of the pipe prior to laying, and are subject to disbonding because of weather extremes or soil stresses.

Substantial improvements in the art of protecting pipe have been achieved through the process described in U.S. Patent No. 3,028,257 issued August 3, 1962, and assigned to the same assignee as the present application. That patent describes the application of heat reactive polymers to surfaces and involves spraying a heat reactive, partly polymerized copolymer with a flammable liquid diluent at a temperature above the flashpoint of the diluent to atomize the coating composition, whereupon the resulting spray is directed through an envelope of flame and heat directed at the surface to be coated. While in the zone of flame and heat, the polymerization of the copolymer continues at a rapid rate so that shortly after application to the surface in the form of a continuous film, the copolymer is completely set to an infusible coating which is completely resistant to attack by chemicals, soil bacteria, and electrolytic corrosion.

Most of the commercial applications of the flame spraying process described in the aforementioned patent have involved the use of commercially available drying oils embodying partly oxidized butadiene-styrene copolymers sold commercially under the trademarks "Buton 200" and "Buton 300." The composition also contains a mixture of solvents, particularly xylenes and aliphatic alcohol such as isopropanol. The butadiene-styrene copolymers contain about 75 to 85% butadiene and 15 to 25% styrene. They may be prepared in a number of manners including reaction of the monomers in the presence of sodium. The copolymers may contain hardness modifying agents such as maleic acid, fumaric acid, thioglycolic acid, thiosalicyclic acid, mercaptophthalic acid, itaconic acid, mesaconic acid, citraconic acid, acrylic acid or esters thereof in small amounts. They may also contain small amounts of alkylated phenols or other promoters. The copolymers may also contain modifiers such as acrylic nitriles, alkyl acrylates, vinyl acetate, vinyl ketones, cinnamaldehyde, thioglycolic acid, and the like. The copolymers may also contain bodying agents such as maleic anhydride.

The butadiene and styrene may be copolymerized in the presence of sodium and a reaction diluent such as aliphatic hydrocarbon at temperatures ranging from about 25° C. to 95° C. The copolymers are then partly oxidized usually by air blowing until the material absorbs from about 5% to 20% of its weight in oxygen. This partial oxidation results in the production of polar groups in the molecule including hydroxyl groups and carboxy groups. The partly oxidized material is sufficiently acid to have an acid number on the order of 5 to 18.

The copolymer is dissolved in an aromatic hydrocarbon solvent during oxidation by blowing. Some of the solvent is then stripped off leaving a solids content of about 58–60%. Enough isopropanol is then added to produce a composition having about 50% solids.

While the use of the aforementioned partly oxidized material has been found to be satisfactory for the purposes intended, continued research has shown that the properties of the coating can be substantially improved, and the economies of the process improved by modification of the composition in the manner to be described.

An object of the present invention is to provide an improved liquid coating composition which is settable by heat to an impervious coating.

A further object of the invention is to provide an improved butadiene-styrene copolymer composition which is significantly less brittle when set than similar compositions heretofore employed.

Still another object of the invention is to provide improved coating compositions including a combination of a butadiene-styrene copolymer and a partly oxidized butadiene-styrene copolymer to provide a plasticized coating, when set.

Another object of the invention is to provide an improved coating composition of butadiene-styrene copolymers and derivatives which makes it possible to secure a greater solids deposition on the article than has heretofore been common.

In accordance with the present invention, I combine a partly oxidized copolymer of the type described in the preceding portions of the specification with an unoxidized copolymer of the same general description, i.e., a butadiene-styrene copolymer having from 75 to 85% butadiene and 15 to 25% styrene. The material is substantially non-acid, as indicated by its acid number of about 0. It exists as a viscous liquid which is highly unsaturated, having an iodine number of about 300. Its molecular weight ranges up to 10,000, and typically may extend from 8,000 to 10,000. I have found that the combination of this unoxidized copolymer with the partly oxidized copolymer previously employed provides results which could not be achieved through the use of either of the two ingredients of the mixture individually. Specifically, I have found that when the unoxidized copolymer is combined in an amount of 5 to 40% by weight with 60 to 95% by weight of the partly oxidized copolymer, substantially greater amounts of solids can be deposited on the article to be coated, and that the resultant coating is less brittle than occurs through the use of the partly oxidized copolymer alone. What is more, the resultant coating has a higher impact strength, is more flexible, and allows thicker coatings to be deposited.

Apparently, the unoxidized copolymer functions to plasticize the partly oxidized polymer to improve the properties of the set coating as well as participating in the copolymerization reaction. Furthermore, the presence of the unoxidized material apparently reduces a tendency of the partly oxidized material to burn in the environment of heat to which it is subjected, so that less material is lost by burning than has been the experience previously.

The combination of the unoxidized and partly oxidized materials provides these beneficial results despite the fact that the two materials are normally considered incompatible. Nevertheless, if the materials are mixed and heated to a temperature of 120 to 150° F. prior to application, the unoxidized material will become dispersed in the partly oxidized material and its solvent to a degree which is sufficient to deposit greater amounts of solids on the article to be coated. The resulting coating is also benefited to the extent of being more flexible, having a higher impact strength, and the like than coatings produced through the use of each of the ingredients individually.

Suitable solvents for the partly oxidized material include alkanols such as isopropanol and ethanol, petroleum naphthas having a boiling range of about 90 to 120° C., straight run mineral spirits having a boiling range of about 125° to 200° C., or hydrocarbons such as butane, pentane, benzene, toluene, xylene, cyclohexane, butenes, pentenes, chlorinated solvents or the like, alone or in admixture. Sufficient solvent is present to provide a consistency suitable for the type of application which is to be used. Where the material is to be sprayed, the solvent will normally be present in amounts of from 33 to 100 parts by weight for every 100 parts by weight of the incompletely copolymerized solids.

The coating composition may also include other additives. Typical among these is a pigment such as an oxide of chromium of iron or siliceous extender pigments, which can be present in amounts ranging from about 3 to 8% by weight of the composition.

However the coating is applied, it is advisable to preheat the surface to be coated, such preheat temperatures usually ranging from 250° to 500° F.

With the improved coating composition of the present invention, I have found that the liquid sprayed may have a significantly higher solids content than could be employed using other butadiene-styrene copolymer combinations. For example, the total solids content of the composition can be as high as 50 to 75% by weight. This means that less amounts of the solvent have to be disposed of either during or after spraying, and less likelihood that the solvent will cause defects in the coating due to blistering.

A further description of the invention will be made in conjunction with the following specific examples which appear solely for purposes of exemplification and not for the purpose of limiting the scope of the invention.

*Example I*

A coating composition was made up containing 42.43% of a partly oxidized butadiene-styrene copolymer containing from 75 to 85% butadiene and 25 to 15% styrene, and having an acid number of about 10. This was combined with 7.57% of an unoxidized butadiene-styrene copolymer of the same type having a molecular weight of 8,000 to 10,000 and an iodine number of about 300, and an acid number of about 0. A chromium oxide pigment was added in the amount of 3.51% giving it a total solid content of 53.51% of which 79.3% was the slightly oxidized material, 14.1% was the unoxidized copolymer, and 6.6% was the pigment. This material had a solvent containing three parts by weight of "Solvesso 100" (containing xylenes and toluene) and one part by weight of isopropanol to bring the total up to 100%. This liquid composition was sprayed through an envelope of heat and flames at an object using an atomizing air pressure of 40 p.s.i. One hundred and one grams of the material were used to apply a thickness of 5½ mils. This represented a deposition of 0.0544 mil per every gram or, conversely, required 18.36 grams to deposit one mil of thickness.

*Example II*

The same amounts of the partly oxidized polymer and pigment were employed as in Example I, except that the amount of the unoxidized copolymer was increased to 9.31%. The total solids content was then 55.25% of which 76.8% was the partly oxidized material, 16.85% was the unoxidized material, and 6.35% was pigment. The increase in total solids from Example I was 1.74%. When this composition was sprayed at an atomizing pressure of 40 p.s.i., 97 grams of the material provided a coating thickness of 6 mils. Thus, the amount of material required to deposit 1 mil of thickness was reduced to 16 grams, or an increase of 13.6% in deposition occurred as compared with Example I.

*Example III*

The amount of partly oxidized material and pigment was held the same as in Example I, and the amount of unoxidized copolymer was increased to 11.64%, thereby bringing the total solids content to 57.58%. This represented an increase of 4.07% over the solids content of the composition of Example I. The solids content was divided between 73.7% of the partly oxidized material, 20.2% of the unoxidized material, and 6.1% of the pigment. When this formulation was applied at an atomizing pressure of 40 p.s.i., 84 grams of the material were sufficient to produce a coating thickness of 5½ mils. This meant that 15.5 grams of the material were required to produce a mil of coating thickness on the average. The increase in deposition between this material and that of Example I, therefore, amounted to about 22%.

While the preceding discussion has dealt primarily with the use of the flame spray process of the type described in the aforementioned patent, the compositions of the present invention can also be applied by other means. For example, the compositions can be sprayed onto a pre-heated article without the use of a flame and heat envelope, provided that the freshly applied coating is shortly thereafter contacted with a curing flame or other heat source sufficient to advance substantially the curing of the copolymer into its finally set form.

It should be evident that various modifications can be made to the described embodiments without departing from the scope of the present invention.

I claim as my invention:

1. A composition settable by heat into an impervious protective coating comprising a mixture whose solids content contains from 5 to 40% of (a) a viscous liquid butadiene-styrene copolymer containing from 75 to 85% butadiene and 15 to 25% styrene and from 60 to 95% of (b) a partly oxidized butadiene-styrene copolymer containing from 75 to 85% butadiene and 15 to 25% styrene, said partly oxidized polymer having been oxidized to the extent of assimilating from about 5 to 20% of its weight in oxygen, and a solvent for (b).

2. The composition of claim 1 in which the total solids range from 50 to 75% by weight of the composition.

3. Compositions settable by heat into an impervious protective coating comprising a mixture whose solids content contains from 5 to 40% of (a) a viscous liquid butadiene-styrene copolymer containing from 75 to 85% butadiene and 15 to 25% styrene, said copolymer having an acid number of substantially 0 and 60 to 95% of (b) a partly oxidized butadiene-styrene copolymer containing from 75 to 85% butadiene and 15 to 25% styrene, said partly oxidized copolymer having an acid number on the order of 5 to 18, in combination with a solvent for (b).

4. The composition of claim 3 in which said solvent is a mixture of xylenes and an aliphatic alcohol.

References Cited by the Examiner
UNITED STATES PATENTS

| | | | |
|---|---|---|---|
| 2,855,376 | 10/58 | Shotton et al. | 260—33.6 |
| 2,876,207 | 3/59 | Henderson | 260—33.4 |
| 2,959,619 | 11/60 | Hutchinson | 260—33.6 |
| 3,036,025 | 5/62 | Hutchinson | 260—33.4 XR |

MORRIS LIEBMAN, *Primary Examiner.*